United States Patent Office 3,031,919
Patented May 1, 1962

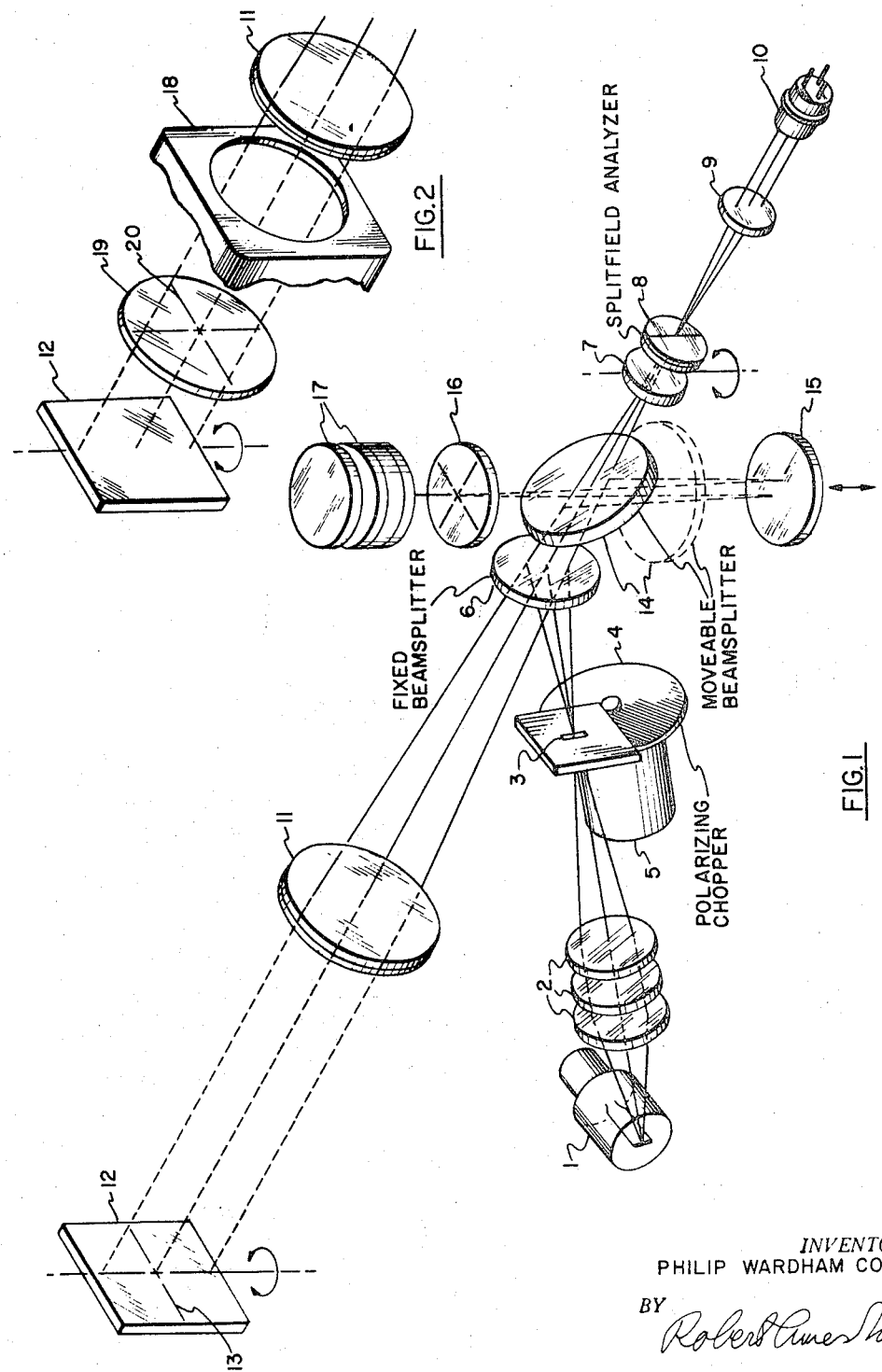

3,031,919
VISUAL MONITORING DEVICE
Philip Wardham Collyer, Stamford, Conn., assignor to Barnes Engineering Company, Stamford, Conn., a corporation of Delaware
Filed Dec. 9, 1959, Ser. No. 858,444
4 Claims. (Cl. 88—14)

This invention relates to an improved autocollimator and more particularly to an instrument performing a dual function of monitoring rotation of an external reflective element and translation thereof.

The autocollimator is a precision instrument for detecting very small changes in angular rotation of a reflective element which may be a mirror, a retroreflecting prism or similar optical element. For a number of purposes it is important to be able to measure with great precision the angular orientation of a rotatable reflecting element at a distance. Essentially an autocollimator is an instrument, usually aimable, which includes a light source, means for transforming light from the light source into a collimated beam which leaves the instrument and which, when the instrument is properly aimed, strikes the external reflecting element, either directly or via a folded path, whichever is operationally most convenient. As far as the instrument is concerned it is immaterial whether the collimated beam is reflected directly back in a straight line or is reflected in a folded path from suitable auxiliary mirrors. In each case the reflected beam returns to the instrument parallel to the emitted beam and still collimated. The optics of the autocollimator then image the collimated beam on a suitable surface and light detecting means are included which measure movement of the image of the collimated beam on the surface. Rotation of the distant reflective element produces a movement of the image of the returning collimated beam and transforms this information into usable signals, usually electrical. The electric signals may be used either to operate suitable servo mechanisms to bring back the reflective element to precise alignment or to measure degree of deviation from precise alignment, that is to say, degree of rotation of the reflective element. Looking at the instrument in another way it may be said that the autocollimator is interested only in detecting movement of the image by reason of rotation of the external reflective element regardless of the use to which the resulting electrical signals are put.

Depending on the optics and other constructional features of the autocollimator, the instrument can measure very small amounts of rotation of the reflective element and so when suitably designed an autocollimator is an instrument of extraordinary precision for its particular measuring purpose.

For many purposes it is desirable to monitor visually the behavior of the autocollimator. It is, of course, easy to introduce visual optics which can focus the moving image of the autocollimator for visual observation.

Autocollimators are subject to one limitation which might in a sense be considered as a limitation on their complete automaticity. This limitation involves the necessity of aiming the autocollimator at the external reflecting element in the first place. Various proposals have been made to solve this problem, the obvious one being a simple sighting telescope aligned with the optical axis of the autocollimator. It is also possible, in certain designs, where visual observation is provided to utilize a portion of the optics of the autocollimator so that the visual observation means turns it into a telescope to be used for initial aiming of the autocollimator at its distant reflecting element.

Except for very distant reflecting elements which are so far in comparison to the focal length of the autocollimator imaging optics that they may be considered at infinity it is necessary to refocus the visual observation device. This can be done, of course, by movable eye piece which is conventional in telescopes, binoculars and similar instruments. Even when refocused on the distant reflecting element the autocollimator is still at best an ordinary telescope. It can be used for initial rough aiming of the instrument at the remote reflective element but for this purpose it presents no advantage over an ordinary telescopic sight.

Autocollimators, when initially aimed, whether by a separate telescopic sight or by a combined visual observing eye piece, are only roughly aimed and are incapable of measurement with any useful degree of precision of a second very important characteristic of the remote reflecting element, namely its misalignment by linear translation.

The necessity for precise linear alignment of the distant reflecting element has not hitherto been realized in any known autocollimators. Its importance merits brief consideration which requires also a consideration of the operation of an autocollimator as such after it has been aimed at its remote reflecting surface. It has been stated above that an autocollimator images the reflected collimated beam as a small image on a certain plane. Typical instruments include those in which this plane is made up of two photoelectric detectors with a dividing line at the point of perfect alignment. In such an instrument, of course, movement of the image from one side of the divided detector to the other results in different signals or a cancellation when its exactly on the dividing line. Another type of autocollimator uses a mask in the plane having a small slit. The mask itself may be tilted so long as the slit permits passage of the image to a detector behind the slit. A third type of autocollimator and to date the most effective and precise type employs polarized light, the plane of polarization of which is rotated at a predetermined frequency. The image or selecting plane is then a split field polarized light analyzer back of which is any suitable photoelectric detector of sufficient area so that it receives energy from the image in any part of the analyzer. In this type of autocollimator the movement of the image results in A.C. signals of different phase depending on which side of the analyzer the image may have moved to. On the dividing line between the two fields the two signals cancel each other producing a null reading or rather a null signal.

Regardless of the particular form of image movement or detector or detecting system translational misalignment of the reflecting element adversely affects the instrument. Serious misalignment translationally may even produce a spurious signal, especially if the remote mirror or other external elements have slight dioptric power. In all cases including the polarized light and split field analyzer the energy level is reduced because if there is translational misalignment the reflected beam no longer completely fills the entrance pupil of the autocollimator which results in a loss of energy and a corresponding, but not ordinarily noticed reducton of sensitivity of the instrument.

The present invention constitutes an improved autocollimater provided with focusable means for visual observation of the image when the instrument is operating as an autocollimator, with constantly optically aligned and focused indicia. With a suitable reflecting element or with suitable reflecting elements in the beam path, this permits precision measurement of translational misalignment when the autocollimator is used as a telescope. Except for the visual observation optics which are necessary in any event if the autocollimator is to be usable as a telescope, the present invention performs its dual function without adding any optical elements.

When visual observation is used some form of beam splitting is required. In the case of the slit type instrument, as referred to above, this requirement does not necessarily reduce the energy reaching the photoelectric detector when the instrument is operating automatically. In the case of other types of autocollimators beam splitting means may somewhat reduce the energy and, in a preferred modification of the present invention, these beam splitting means may be thrown into or out of the beam at will thus permitting full energy operation when visual operation is not required. In its broader aspects the invention is not limited to this feature as it is possible with sensitive optics to use so small a proportion of the beam energy for visual monitoring that the beam splitting means may be permitted to remain permanently in the beam.

Except for the added visual monitoring means the autocollimators are not in any way altered by the present invention which is an important advantage as it does not require redesigned instruments or any compromise with efficient operation.

When autocollimators are provided with visual means which can be used to operate the device as a telescope the light source of the autocollimator may be turned on or turned off depending on the ambient light conditions surrounding the remote reflecting element. The present invention in no sense interferes with such provisions.

Essentially the present invention includes four elements. The first is a fixed eye piece or ocular. Secondly, fixed indicia are provided such as a reticle with cross hairs or other indicia in fixed focus relation to the ocular so that regardless of focusing conditions the reticle indicia are always sharply observed through the ocular. Thirdly, there is provided a beam splitting means such as a partially reflecting inclined mirror which, in the preferred modification of the invention, may be movable so that it can be alternately thrown into the beam or out. Finally, and this is an important element of the invention, there is a precisely movable focusing mirror in the beam reflected from the movable beam splitter. In the broader aspects of the present invention this may be the only movable element and even if a movable beam splitter is provided it is the only element which requires precise motion.

In the present invention, the indicia on the reticle are always in sharp focus regardless of the position of the movable mirror.

A further advantage of the present invention is that focusing with fixed ocular and reticle and movable mirror provides for maximum compactness because the movement of the mirror to change focus is only half that which would be required if the eye piece itself were moved to effect focusing.

The indicia on the reticle, always in sharp focus, permit a much greater precision of measurement of translational alignment of the remote reflecting element. Even if the reflecting element is perfectly plain, indicia such as cross hairs, a frame or other suitable indicia permit much more precise determination of translational alignment. If the remote reflecting element, or a window in its beam, also are provided with indicia and the ocular is focused thereon a maximum of precision in translational alignment is possible. For example, two cross hairs can be brought into alignment with great precision.

Sometimes the effect of translational misalignment is best determined by whether the beam is parallel to the line joining the center of the entrance pupil of the autocollimator and the center of external apertures. In such a case the reticle may be provided with one or more circles of suitable size.

Two simple types of indicia have been described such as cross hairs and one or more circles representing aperture stops. In most autocollimators indicia of these types are preferable but the invention is in no sense limited to these particular indicia. The same advantage of the invention is obtained regardless of the nature of the indicia used so long, of course, as they are properly chosen to show up translational misalignment. In the specification and claims indicia of this type will be referred to generally as "translation misalignment indicia." Sometimes the indicia on a reflecting surface may not line up perfectly. For instance cross hairs may not be exactly parallel with cross hairs in the instrument reticle. In such cases it is possible to use a reticle which can be rotated to bring its indicia in exact alignment with the indicia external to the instrument. Such reticles are included and it should be noted that the provisions of a rotatable reticle in no sense adversely affects the important characteristic of the present invention that the indicia are always at a fixed distance from the ocular and are sharply focused thereby.

The invention will be described in greater detail in conjunction with a typical polarized light photoelectrical autocollimator and is illustrated in the drawings in which:

FIG. 1 is a perspective view of a photoelectric autocollimator including the present invention, and FIG. 2 is a detail of modified external optics.

A photoelectric autocollimator is shown diagrammatically in FIG. 1 and is provided with a lamp 1, condensing lenses 2, a slit 3, a rotating polarizer 4 and a motor 5. This produces a beam of light from the slit, the plane of polarization of which is rotated at the frequency determined by the motor speed. The beam from the slit 3 strikes a fixed beam splitting mirror 6, approximately half of the energy being reflected and the other half transmitted.

The portion of the beam reflected from the beam splitting mirror 6 passes through objective 11 which collimates it, and strikes the remote reflecting element, the mirror 12 which may be provided with cross hairs 13 or other aiming indicia. The beam is reflected back from the mirror 12, again passes through the objective, the beam splitting mirror 6, a plane-parallel glass plate 7, a split-field analyzer 8, the field lens 9 and finally strikes the detector 10. The analyzer is shown as consisting of two semicircles of polarizing material, the planes of polarization of which are at right angles to each other. When the image is directly on the dividing line of the two fields of the analyzer it does not pulsate with the rotation of the plane of polarization by the rotating polarizer 4. This constitutes a zero signal which is a reference.

If the image moves horizontally from the center line of the two fields in the analyzer 8 its light will be chopped by the rotation of the plane of polarization of the light. A sinusoidal signal is produced, the phase of which differs by 180° depending on which side of the analyzer is struck by the image. This signal can either be metered or used by conventional servo means to rotate the remote mirror and thus maintain the image centered on the line dividing the two fields. The problem of a sizeable image is not serious because if it is centered on the line there will be just as much light pulsating in one phase as in the other and the two phases in the electrical signal will cancel each other.

A movable beam splitting mirror 14 is provided which can be moved into one of two positions. In the drawing it is shown in full lines as being interposed in the beam. A portion of the radiant energy is, therefore, reflected to the focusing mirror 15 and is imaged on a reticle 16 which is viewed by an ocular 17. The reticle is provided with suitable cross hairs or other design.

The focusing mirror may be moved through a range which enables objects at distances from infinity down to a few multiples of the focal length from the objective lens of the autocollimator to be sharply imaged on the reticle.

When the mirror is at the uppermost limit of its excursion the optical path from the objective through the fixed beam splitter, to the movable beam splitter, down to the focusing mirror and up through the movable beam splitter to the reticle is equal to the back focal length of the objective lens. In this position then, the image of the slit will be sharply focused on the reticle, and the angular position of the remote mirror may be monitored visually.

The field of view of the visual system is large and so although the mirror 12 may be turned sufficiently far or the target may be sufficiently displaced so that it would come out of the field of view of the analyzer and detector it is still seen by the ocular and it can be determined by the cross hairs that the mirror is or is not parallel in which case the slit image will or will not be coincident with the cross lines on the reticle. At this point, if desired, the beam splitting mirror 14 may be thrown to the position shown in dotted lines in which it is out of the beam and, therefore, does not reduce the energy of the image on the analyzer. With images of low intensity this conservation of light energy may be of considerable importance. In other cases where there is an excess of light energy over the minimum needed the mirror may remain in its first position to permit continuous visual monitoring. In most practical instruments it is desirable to throw the beam splitting mirror 14 out of the beam when it is not in use, but the invention is not limited to this preferred construction and includes a beam splitting element which is continuously in the beam.

When, on the other hand, it is desired to check the translational position of the external mirror 12, or of other intermediate windows or apertures, the focusing mirror may be moved downward until the crosslines on such external elements, or the periphery of such apertures, are focused on the reticle. The amount of mirror motion is determined from elementary optical principles to be equal $$\frac{1}{2(N-1)}$$

to where N is the distance from the objective lens of the autocollimator to such mirror, window, or aperture, measured in units equal to the focal length of the objective lens. When the mirror is so moved the sought-after image is sharply focused on the reticle.

If the image of the observed remote reflecting element is decentered relative to the reticle, such remote element or the autocollimator may be translated until the image is centered. The operator is thus assured that the beam from the autocollimator is centered in the aperture of the external element. There is then no loss of energy and the instrument operates at maximum sensitivity.

FIGURE 2 illustrates a modification in which the indicia are on elements other than the remote mirror itself. In this modification there is shown a plain mirror 12 and two optical elements, an aperture plate 18 and a window 19 with cross hairs 20, interposed in the beam to and from the mirror 12. As the rest of the beam and the beam splitting detecting and visual monitoring elements are identical with FIG. 1 they are not repeated and the beam is shown as broken away.

The two elements 18 and 19 are illustrative of typical optical elements which require visual monitoring. For example, let us suppose it is important that the whole of the beam be used. The present invention can then be utilized to line up the beam with the aperture in the plate 18. When it is lined up so that it completely fills the aperture there is no lost light resulting from misalignment or misadjustment. The plate 18 is shown in diagrammatic form and may be a fixed aperture or it may be an adjustable aperture such as a conventional iris diagram.

Another situation is involved where it is desired to center the beam in a window. This is shown diagrammatically at 19 and this time the cross hairs 20 are in the window instead of on the mirror as in FIG. 1. Instrument alignment can be effected by lining up cross hairs in the reticle 16 with the cross hairs 20.

FIG. 2 illustrates only two of a number of types of optical elements which may require visual monitoring and is intended to be illustrative only and not to limit the invention to the particular element or elements shown.

Sometimes rotational alignment of an element about the optical axis is desirable, for example, a retroreflective prism may be required to be aligned in a certain position. The visual monitoring quickly shows whether there is a perfect rotational alignment.

I claim:
1. An autocollimator which comprises in combination and in optical alignment a source of light, means for producing a beam from said source, first beam splitting means in said beam, collimating means in one of said split beams, a selective detection plane oriented so that collimated light striking the collimating means is focused thereon, an ocular, a fixed plane bearing translation misalignment indicia and sharply focusable through the ocular, a second beam splitting means in the beam between the first beam splitting means and the selective detection plane and a movable focusing mirror positioned to receive one of the split beams and imaging it on the indicia plane.

2. An autocollimator according to claim 1 in which the second beam splitting means is movable to a position out of the beam focused on the selective detection plane.

3. An autocollimator according to claim 1 in which the means for producing a beam is a means for producing a beam of plane polarized light, the plane of polarization rotating at a predetermined frequency, and the selective detection plane contains a split field analyzer.

4. An autocollimator according to claim 2 in which the means for producing a beam is a means for producing a beam of plane polarized light, the plane of polarization rotating at a predetermined frequency, and the selective detection plane contains a split field analyzer.

References Cited in the file of this patent

UNITED STATES PATENTS

| | | |
|---|---|---|
| 2,167,484 | Berry | July 25, 1939 |
| 2,481,082 | Chew | Sept. 6, 1949 |
| 2,861,493 | Landegren | Nov. 25, 1958 |
| 2,870,671 | Falconi | Jan. 27, 1959 |
| 2,917,967 | Steglich | Dec. 22, 1959 |

FOREIGN PATENTS

| | | |
|---|---|---|
| 540,876 | Great Britain | Nov. 4, 1941 |
| 684,435 | Great Britain | Dec. 17, 1952 |
| 821,466 | Great Britain | Oct. 7, 1959 |